United States Patent
Flam

(10) Patent No.: US 7,494,307 B2
(45) Date of Patent: Feb. 24, 2009

(54) TOOL ADAPTER

(76) Inventor: Mirko Flam, Burrenweg 5, 72636 Tischardt (DE)

( * ) Notice: Subject to any disclaimer, the term of this patent is extended or adjusted under 35 U.S.C. 154(b) by 115 days.

(21) Appl. No.: 11/631,546

(22) PCT Filed: Jul. 14, 2005

(86) PCT No.: PCT/EP2005/007650

§ 371 (c)(1),
(2), (4) Date: Jan. 4, 2007

(87) PCT Pub. No.: WO2006/008059

PCT Pub. Date: Jan. 26, 2006

(65) Prior Publication Data

US 2007/0231092 A1    Oct. 4, 2007

(30) Foreign Application Priority Data

Jul. 16, 2004  (DE) .................. 20 2004 011 571 U

(51) Int. Cl.
*B23Q 3/12*     (2006.01)
*B23B 31/107*   (2006.01)
(52) U.S. Cl. ............... 409/234; 408/239 R; 408/56; 279/83
(58) Field of Classification Search ......... 409/232, 409/234; 408/238, 239 R, 56, 57, 59; 279/83, 279/20; *B23B 31/107; B23Q 3/12*
See application file for complete search history.

(56) References Cited

U.S. PATENT DOCUMENTS

| 4,718,799 | A |   | 1/1988  | Hubscher |
|-----------|---|---|---------|----------|
| 4,976,574 | A | * | 12/1990 | Muendlein et al. ........ 409/232 |
| 5,110,240 | A | * | 5/1992  | Zeilinger et al. ........ 409/234 |
| 6,299,394 | B1| * | 10/2001 | Stojanovski ............ 409/234 |
| 6,766,817 | B2|   | 7/2004  | da Silva |
| 6,918,404 | B2|   | 7/2005  | Dias da Silva |
| 7,066,586 | B2|   | 6/2006  | da Silva |

(Continued)

FOREIGN PATENT DOCUMENTS

DE     2 234 389     1/1974

(Continued)

OTHER PUBLICATIONS

International Search Report.

*Primary Examiner*—Daniel W Howell
(74) *Attorney, Agent, or Firm*—Collard & Roe, P.C.

(57) ABSTRACT

The invention relates to a tool adapter which can be fixed to tool machines in a detachable and interchangeable manner, the tool machines being drilling and milling or similar cutting tool machines comprising at least one rotating work spindle. The tool machines are used to receive and position cutting tools, whereby the tool adapter (1) which is made of a spherical section (4) and a cylindrical band (3) is secured to a tool receiving element (2) and the tool receiving element (2) comprises, preferably, a central bore (5) for supplying a coolant. Opposite lying traversal bores (8, 9) which are used to receive clamping bolts (10, 11) are provided in the tool adapter (1) in a tool-sided cylindrical band (3) which is adjacent to the spherical section (4) the band being, preferably, diametrical and comprising a planar system arranged on a tool-sided receiving area and pointing to the tool receiving element (2).

6 Claims, 1 Drawing Sheet

U.S. PATENT DOCUMENTS

| | | | |
|---|---|---|---|
| 7,281,888 B1 * | 10/2007 | Kaiser et al. | 409/234 |
| 7,285,255 B2 | 10/2007 | Kadlec et al. | |
| 2007/0212281 A1 | 9/2007 | Kadlec et al. | |

FOREIGN PATENT DOCUMENTS

| | | |
|---|---|---|
| DE | 31 31 478 | 2/1983 |
| DE | 3808108 A1 * | 9/1989 |
| DE | 4210144 A1 * | 9/1993 |
| DE | 4400425 A1 * | 7/1995 |
| DE | 20 314 093 | 2/2004 |
| EP | 0138 336 | 4/1985 |
| GB | 2 171 937 | 9/1986 |

* cited by examiner

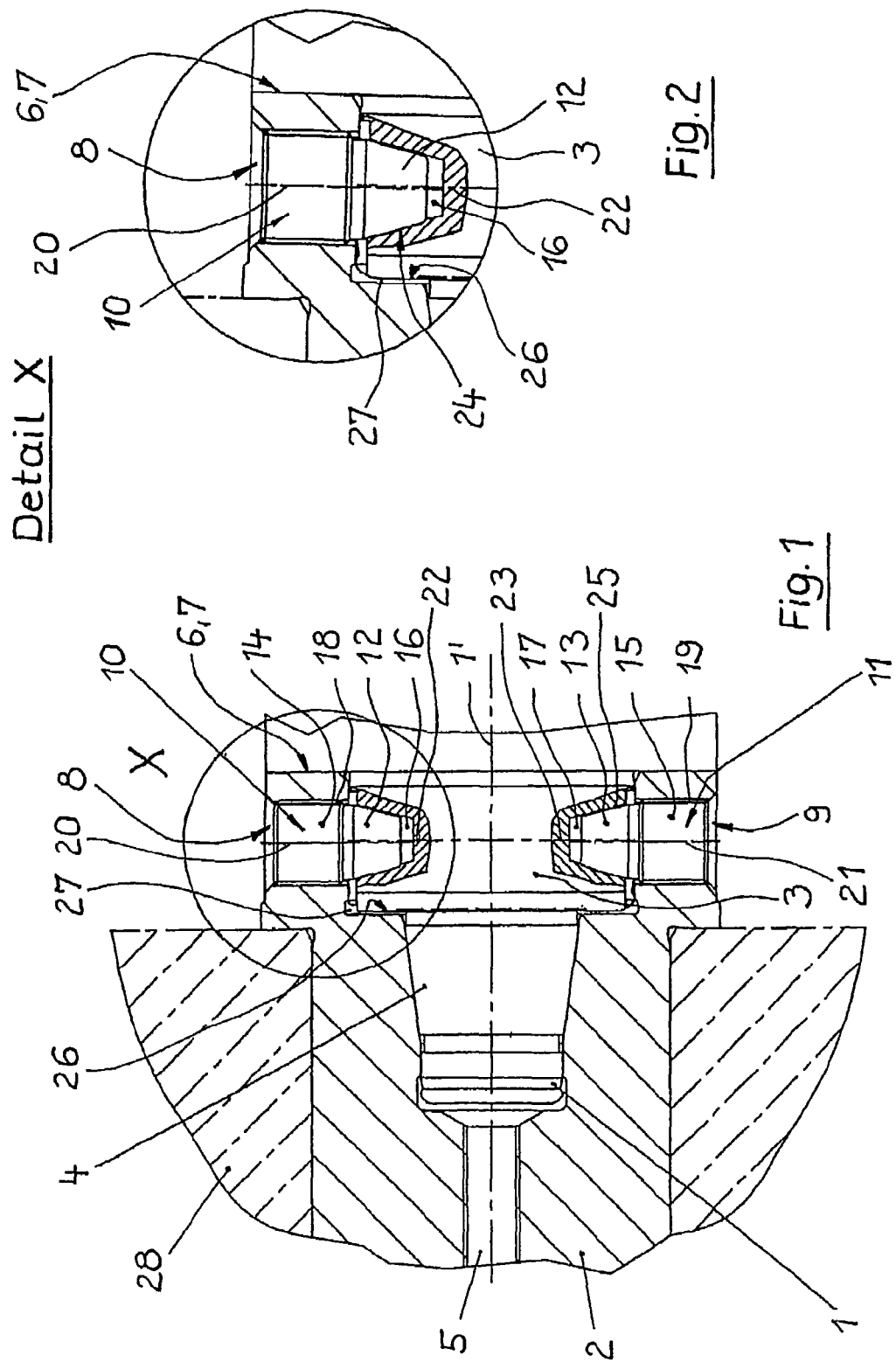

TOOL ADAPTER

CROSS REFERENCE TO RELATED APPLICATIONS

Applicant claims priority under 35 U.S.C. §119 of German Application No. 20 2004 011 571.9 filed Jul. 16, 2004. Applicant also claims priority under 35 U.S.C. §365 of PCT/EP2005/007650 filed Jul. 14, 2005. The international application under PCT article 21(2) was not published in English.

The present invention relates to a tool adapter in accordance with the preamble of claim 1.

Tool adapters are known from the state of the art, for releasable and interchangeable attachment of a drilling, milling, sawing or other rotating tool on the tool accommodation of a rotating tool spindle of a processing machine. The tool adapters have a tool side, on which a tool shaft of a tool is clamped or fixed in place, in known manner, and a machine side, on which the tool accommodation is attached, whereby either the tool accommodation can be releasably attached to the rotating tool spindle of the processing machine, or the tool accommodation already forms an integral part of this tool spindle. The tool adapter is configured essentially symmetrical to the axis of rotation of the tool, in order to avoid the balance errors that occur due to high speeds of rotation during the processing of work pieces.

Tool adapters are known from the state of the art, in which a cone segment that narrows conically towards the machine side, in the axial direction, is provided with a collar that directly follows the segment towards the tool side, having a planar contact piece, whereby the planar contact piece is oriented perpendicular to the axis of rotation of the tool adapter. The tool side follows the collar with a known device for attaching a tool or tool shaft. Crosswise bores in the tool adapter and in the tool accommodation, disposed in the radial direction, serve to connect the conical segment of the tool adapter with the tool accommodation; tensioning bolts that have a conical segment are inserted into these bores, usually by way of threaded bores in the tool adapter as well as outside threads on the tensioning bolts. The tool adapter is thereby provided in the tool accommodation so as to be releasable, interchangeable, and the conical segment serves for guidance and/or orientation of the tool adapter relative to the tool accommodation. For this purpose, the tool accommodation has a correspondingly conically configured accommodation opening for the conical segment of the tool adapter, as well as a planar contact surface against which the planar contact piece of the collar of the tool adapter rests in the assembled state, and serves for precise orientation of the tool adapter relative to the tool accommodation, i.e. the axis of rotation. Tool adapters are used in order to be able to use tools having different tool shaft diameters, in particular, on one and the same tool spindle of a processing machine, and in order to rapidly interchange tools in simple and cost-effective manner.

It has proven to be disadvantageous in this connection that when using several adapters, in particular, in the axial direction, one behind the other, for example in order to be able to use a tool with a small shaft diameter in a tool spindle having a large diameter, it is not possible to precisely align the individual adapters axially relative to one another, and with the tool spindle, using the known adapters, since a lateral offset in the axial direction always occurs, because clamping occurs on one side, with a single tensioning bolt, and forces act perpendicular to the axis of rotation, so that balance errors occur. This means that in the case of a crosswise stress on the adapter, even if the adapter is firmly clamped in the tool accommodation, it is always subject to slight tilting, so that the processing result is made worse.

From DE 203 14 093 U1, a tool adapter is known that has two or more symmetrically distributed crosswise bores on the circumference of the conical segment of the tool adapter, and a cylindrical collar that follows the conical segment, to better guarantee precise orientation of the tool adapter with a tool, even when great crosswise stresses occur.

Proceeding from this state of the art, the task of the present invention consists in improving a tool adapter in such a manner that not only is the axial orientation of the tool adapter further improved, particularly when great crosswise stresses occur, but also, clamping the tool adapter into the tool accommodation is further improved; furthermore, an improved seal of the adapter while working, to prevent penetration of cooling fluid, is supposed to be achieved.

According to the invention, this task is accomplished by means of a tool adapter having the characteristics of claim 1. Advantageous embodiments of the invention are the object of the subordinate claims 2 to 6.

The new configuration of the tool adapter according to the invention consists in the fact that in a tool adapter, in a cylindrical collar that follows a conical segment, crosswise bores that preferably lie diametrically opposite one another are provided, for accommodating tensioning bolts, and the cylindrical collar has a planar contact piece that faces the accommodation region on the tool side. Because the cylindrical collar, which absorbs crosswise forces that occur during processing, was relocated to the right, towards the tool side, higher torques can be transferred, so that crosswise stresses of the tool adapter, which can be brought about by balance errors that occur, even if the adapter is firmly clamped in the tool accommodation, can be better balanced out, and the axial orientation of the adapter with the tool disposed in it is further improved when high crosswise stresses occur, by means of the absorption of the crosswise forces by the tensioning bolts disposed in the cylindrical collar, in the crosswise bores. This particularly relates to forces that act perpendicular to the axis of rotation, for example forces that occur during milling.

It is advantageous if it is provided that at least two crosswise bores are symmetrically disposed on the circumference of the cylindrical collar of the tool adapter, which bores each have a threaded bore and a conical bore that follows it, formed in the cylindrical collar, to accommodate the tensioning bolts, in order to obtain better attachment of the tool adapter in the tool accommodation. For this purpose, the tensioning bolts preferably have a threaded projection for attachment in the tool accommodation, and a conical segment that serves for guidance and orientation of the tool adapter in the tool accommodation.

A preferred embodiment is seen in that the tool accommodation of the tool adapter has a planar contact piece on the tool side, towards the accommodation region, which is configured with a hollow grinding. In this way, a better seal relative to a cooling fluid is obtained, in order to preclude the capillary effect that occurs in the case of a seal with regard to the cooling fluid, as compared with known arrangements, in the case of the coolant being supplied by way of the central axial bore, in the interior of the tool adapter.

It is furthermore advantageous if it is provided that the axes of the conical segments have an offset relative to the axes of the conical bores in the cylindrical collar of the tool adapter, when the planar contact piece of the cylindrical collar lies against the planar contact surface of the tool accommodation.

Another advantageous embodiment consists in the fact that a gap is provided between the transition surface of the tool accommodation to the cylindrical collar of the tool adapter in order to guarantee contact of the planar contact piece against the planar contact surface of the tool accommodation, and thereby to prevent over-determinations.

A significant advantage of the present invention consists in the fact that an improved and more precise axial orientation of a tool adapter, i.e. of the tool disposed on it, is achieved by means of the new configuration of the tool side of the tool adapter. Because of the improved configuration of the tool adapter, great crosswise stresses can be absorbed during processing. Furthermore, a better seal of the tool accommodation relative to the cooling fluid that is necessary for processing is obtained, by means of the arrangement of the planar contact piece of the tool accommodation towards the tool-side accommodation region, which is also new. Another advantage of the new tool adapter consists in the fact that it is suitable for use at very high speeds of rotation, particularly also because only minimal balance errors occur in the case of this tool adapter, because of the improved absorption of crosswise forces that occur.

An exemplary embodiment of a tool adapter according to the invention is shown schematically in the drawings, and explained in greater detail below.

The drawing shows:

FIG. 1 a tool adapter according to the invention, in a sectional representation and FIG. 2 a detail "x" from FIG. 1, the arrangement of a tensioning bolt in the tool adapter, in section.

FIG. 1 shows, in a so-called longitudinal section, a tool adapter 1 configured symmetrical to an axis of rotation 1', for attachment in a tool accommodation 2, provided on the machine side, consisting of a conical segment 4 and a cylindrical collar 3 provided on the tool side, and a planar contact piece 7, which is configured on the cylindrical collar 3 on the tool side, and oriented perpendicular to the axis of rotation 1', and rests against a planar contact surface 6 of the tool accommodation 2 in the clamped-in state. The planar contact piece 7 or the contact surface (6) preferably has a hollow grinding, i.e. it is slightly, preferably in the thousandth of a millimeter range, inclined relative to the axis of rotation, as compared with the perpendicular, in order to achieve a better seal with regard to the cooling fluid that is applied while working, to the work piece or to the tool, respectively, or with regard to the cooling fluid mist, respectively.

The conical segment 4 that follows the cylindrical collar 3 of the tool adapter 1 towards the machine side serves to guide and orient the tool adapter 1 with regard to the tool accommodation 2. For attaching the tool adapter 1 in the tool accommodation 2, tensioning bolts 10, 11 are provided in crosswise bores 8, 9, in each instance, which reach all the way into the circumference surface of the cylindrical collar 3 of the tool adapter 1, whereby these bolts 10, 11 are preferably disposed lying diametrically opposite one another in the cylindrical collar 3. The crosswise bores 8, 9 each consist of a threaded bore 18, 19 in the tool accommodation 2 and a conical bore 16, 17 in the cylindrical collar 3.

The tensioning bolts 10, 11 are screwed into the threaded bores 18, 19 of the tool accommodation 2 with their threaded projections 14, 15, and then set themselves into the conical bores 16, 17 in the cylindrical collar 3 of the tool adapter 1, with their conical segments 12, 13, in bracing manner, in order to releasably fix the tool adapter 1 in place on the tool accommodation 2, i.e. brace it. When the tensioning bolts 10, 11 are screwed into the tool accommodation 2, the conical segments 12, 13 of the tensioning bolts 10, 11 draw themselves into the corresponding conical bores 16, 17 in the cylindrical collar 3 of the tool adapter 1. Because of an axially directed offset of the axes 20, 21 of the conical segments 12, 13 of the tensioning bolts 10, 11 relative to the axes 22, 23 of the conical bores 16, 17 in the cylindrical collar 3 of the tool adapter 1, the conical walls 24, 25 of the conical segments 12, 13 of the tensioning bolts 10, 11 come to rest on one side when the planar contact piece 7 of the cylindrical collar 3 lies against the planar contact surface 6 of the tool accommodation 2, and the tool adapter 1 is drawn against the planar contact surface 6 of the tool accommodation 2 with its planar contact piece 7, so that in this way, a defined and secure position of the tool adapter 1 relative to the tool accommodation 2, which is attached in a working spindle of a machine tool, preferably in releasable manner, is obtained. The cylindrical collar 3 is not allowed to make contact with its planar surface 26 that faces away from the planar contact piece 7, but instead, there must be a gap 27 present between this planar surface 26 and a corresponding inner surface of the tool accommodation 2, so that there is no over-determination and therefore always only the planar contact surface 8 and the planar contact piece 7 rest against one another.

The tool accommodation 2 furthermore has a central bore 5 for feeding a coolant to the tool, whereby here in the drawings, the channels for guiding the coolant, which are provided in the tool adapter 1 and are known, are not shown.

The invention is not restricted to the exemplary embodiment shown, but rather is variable in multiple ways, within the framework of the disclosure.

REFERENCE SYMBOL LIST 1 tool adapter
1' axis of rotation of item 1
2 tool accommodation
3 cylindrical collar of the tool adapter (item 1)
4 conical segment of the tool adapter (item 1)
5 central bore in the tool accommodation (item 2)
6 planar contact surface of the tool accommodation (item 2)
7 planar contact piece of the cylindrical collar (item 3)
8 crosswise bore (in item 2 and item 3)
9 crosswise bore (in item 2 and item 3)
10 tensioning bolt
11 tensioning bolt
12 conical segment of the tensioning bolt (item 10)
13 conical segment of the tensioning bolt (item 11)
14 threaded projection of the tensioning bolt (item 10)
15 threaded projection of the tensioning bolt (item 11)
16 conical bore in the cylindrical collar (item 3)
17 conical bore in the cylindrical collar (item 3)
18 threaded bore in the tool accommodation (items 2 and 8)
19 threaded bore in the tool accommodation (items 2 and 9)
20 axis of the conical segment of the tensioning bolt (item 10)
21 axis of the conical segment of the tensioning bolt (item 11)
22 axis of the conical bore (item 16) in the cylindrical collar (item 3)
23 axis of the conical bore (item 17) in the cylindrical collar (item 3)
24 conical wall of the conical segment (item 12) of the tensioning bolt (item 10)
25 conical wall of the conical segment (item 13) of the tensioning bolt (item 11)
26 away-facing planar surface of the cylindrical collar (item 3)
27 gap
28 machine spindle

The invention claimed is:

1. Tool adapter for releasable and interchangeable attachment to machine tools, having at least one rotating work spindle, for the accommodation and positioning of cutting tools, whereby the tool adapter (1), comprising a conical segment (4) and a cylindrical collar (3), is attached to a tool accommodation (2), and the tool accommodation (2) has a central bore (5) for coolant feed, wherein in the tool adapter (1), in a cylindrical collar (3) that follows the conical segment (4) on the tool side, crosswise bores (8, 9) that lie diametrically opposite one another are provided, for accommodating tensioning bolts (10, 11), and wherein the cylindrical collar (3) has a planar contact piece (7) that lies towards an accommodation region on the tool side and faces the tool accommodation (2).

2. Tool adapter according to claim 1, wherein at least two crosswise bores (8, 9) are symmetrically disposed on the circumference of the cylindrical collar (3) of the tool adapter (1), which each have a threaded bore (18, 19) and a conical bore (16, 17) that follows it, worked into the cylindrical collar (3), in the tool accommodation (2), to accommodate the tensioning bolts (10, 11).

3. Tool adapter according to claim 2, wherein the tensioning bolts (10, 11) for attachment in the crosswise bores (8, 9) have a threaded projection (14, 15) and a conical segment (12, 13)

4. Tool adapter according to claim 1, wherein a planar contact surface (6) of the tool accommodation (2) on the tool side or the planar contact piece (7) of the tool adapter (1) that faces the contact surface (6) is configured with hollow grinding.

5. Tool adapter according to claim 3, wherein the axes (20, 21) of the conical segments (12, 13) of the tensioning bolts (10, 11) have an axially directed offset relative to the axes of the conical bores (16, 17) in the cylindrical collar (3) of the tool adapter (1), when the planar contact piece (7) of the cylindrical collar (3) lies against the planar contact surface (6) of the tool accommodation (2)

6. Tool adapter according to claim 1, wherein a gap (27) is provided between a planar surface (26) of the collar (3) that faces away from the planar contact piece (7), and a corresponding inner surface of the tool accommodation (2).

* * * * *